United States Patent
Sanjekar et al.

(10) Patent No.: US 11,017,181 B2
(45) Date of Patent: May 25, 2021

(54) LANGUAGE SELECTION SYSTEM

(71) Applicant: Oath Inc., New York, NY (US)

(72) Inventors: Vinaykumar Ravindra Sanjekar, Mountain View, CA (US); Haiying Huang, Palo Alto, CA (US); Anantharaman Nagarajan, San Jose, CA (US)

(73) Assignee: Verizon Media Inc., New York, NY (US)

( * ) Notice: Subject to any disclaimer, the term of this patent is extended or adjusted under 35 U.S.C. 154(b) by 0 days.

(21) Appl. No.: 16/044,716

(22) Filed: Jul. 25, 2018

(65) Prior Publication Data
US 2019/0294685 A1 Sep. 26, 2019

Related U.S. Application Data

(60) Provisional application No. 62/647,259, filed on Mar. 23, 2018.

(51) Int. Cl.
*G06F 40/58* (2020.01)
*G06F 16/951* (2019.01)
*G06F 40/263* (2020.01)

(52) U.S. Cl.
CPC .......... *G06F 40/58* (2020.01); *G06F 16/951* (2019.01); *G06F 40/263* (2020.01)

(58) Field of Classification Search
CPC ..... G06F 17/289; G06F 16/951; G06F 17/275
USPC .......................... 704/8, 9, 270; 707/772, 706
See application file for complete search history.

(56) References Cited

U.S. PATENT DOCUMENTS

| | | | | |
|---|---|---|---|---|
| 2004/0138924 A1* | 7/2004 | Pristine | ................... | G06Q 10/10 705/2 |
| 2007/0085835 A1* | 4/2007 | Plestid | ................... | G06F 3/0237 345/171 |
| 2008/0254431 A1* | 10/2008 | Woolf | ....................... | G09B 5/00 434/322 |
| 2011/0191316 A1* | 8/2011 | Lai | ............................ | G06F 7/10 707/706 |
| 2012/0016661 A1* | 1/2012 | Pinkas | ..................... | G06F 40/30 704/9 |
| 2013/0073979 A1* | 3/2013 | Shepherd | ............... | G06F 40/284 715/744 |
| 2014/0046976 A1* | 2/2014 | Zhang | ..................... | G06Q 10/10 707/772 |
| 2014/0074629 A1* | 3/2014 | Rathod | .............. | G06Q 30/0277 705/14.73 |

(Continued)

*Primary Examiner* — Akwasi M Sarpong
(74) *Attorney, Agent, or Firm* — Cooper Legal Group, LLC

(57) ABSTRACT

One or more computing devices, systems, and/or methods for selecting a primary language are provided. For example, a profile of a device may be generated comprising indications of a plurality of content items transmitted to the device and/or indications of a plurality of web pages associated with the plurality of content items. The profile may be analyzed to determine that a first language is associated with a plurality of items of the profile and the plurality of items comprises more than a threshold amount of items. The first language may be selected as a primary language of the device. A request for content may be received. A content item, associated with the first language, may be selected based upon the selection of the first language as the primary language. The content item may be transmitted to the device.

20 Claims, 10 Drawing Sheets

(56) References Cited

U.S. PATENT DOCUMENTS

2014/0108935 A1* 4/2014 Yuen .................. G06F 3/167
                                                    715/728
2015/0161227 A1* 6/2015 Buryak ................ G06F 9/454
                                                    707/738

* cited by examiner

LANGUAGE SELECTION SYSTEM

RELATED APPLICATION

This application claims the benefit of U.S. Provisional Application No. 62/647,259, filed Mar. 23, 2018, which is incorporated herein by reference in its entirety.

BACKGROUND

Many services, such as websites, applications, etc. may provide platforms for viewing media. For example, a user may interact with a service, where the service may not have access to language preference information associated with the user. Media in a first language may be presented to the user while the user interacts with the service. However, the user may not be familiar with the first language. Thus, the user may not be able to understand the media.

SUMMARY

In accordance with the present disclosure, one or more computing devices and/or methods are provided. In an example, a first request for content may be received from a device. The first request may comprise an indication of a first web page associated with the first request and an identifier associated with the device. A first content item may be selected from a content items database based upon the first request.

The first content item may be transmitted to the device. An indication of the first content item and/or the indication of the first web page may be stored in a profile of the device. The profile may comprise indications of a plurality of content items transmitted to the device and/or indications of a plurality of web pages associated with the plurality of content items.

The profile may be analyzed to determine one or more languages associated with the plurality of content items and/or the plurality of web pages. It may be determined that a first language is associated with a plurality of items of the profile and the plurality of items comprises more than a threshold amount of items. Responsive to determining that the first language is associated with the plurality of items of the profile and the plurality of items comprises more than the threshold amount of items, the first language may be selected, from amongst the one or more languages, as a primary language of the device.

A second request for content may be received from a second device associated with the profile. The second request may comprise an indication of a second web page associated with the second request. A second content item associated with the first language may be selected from the content items database based upon the selection of the first language as the primary language. The second content item may be transmitted to the second device.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
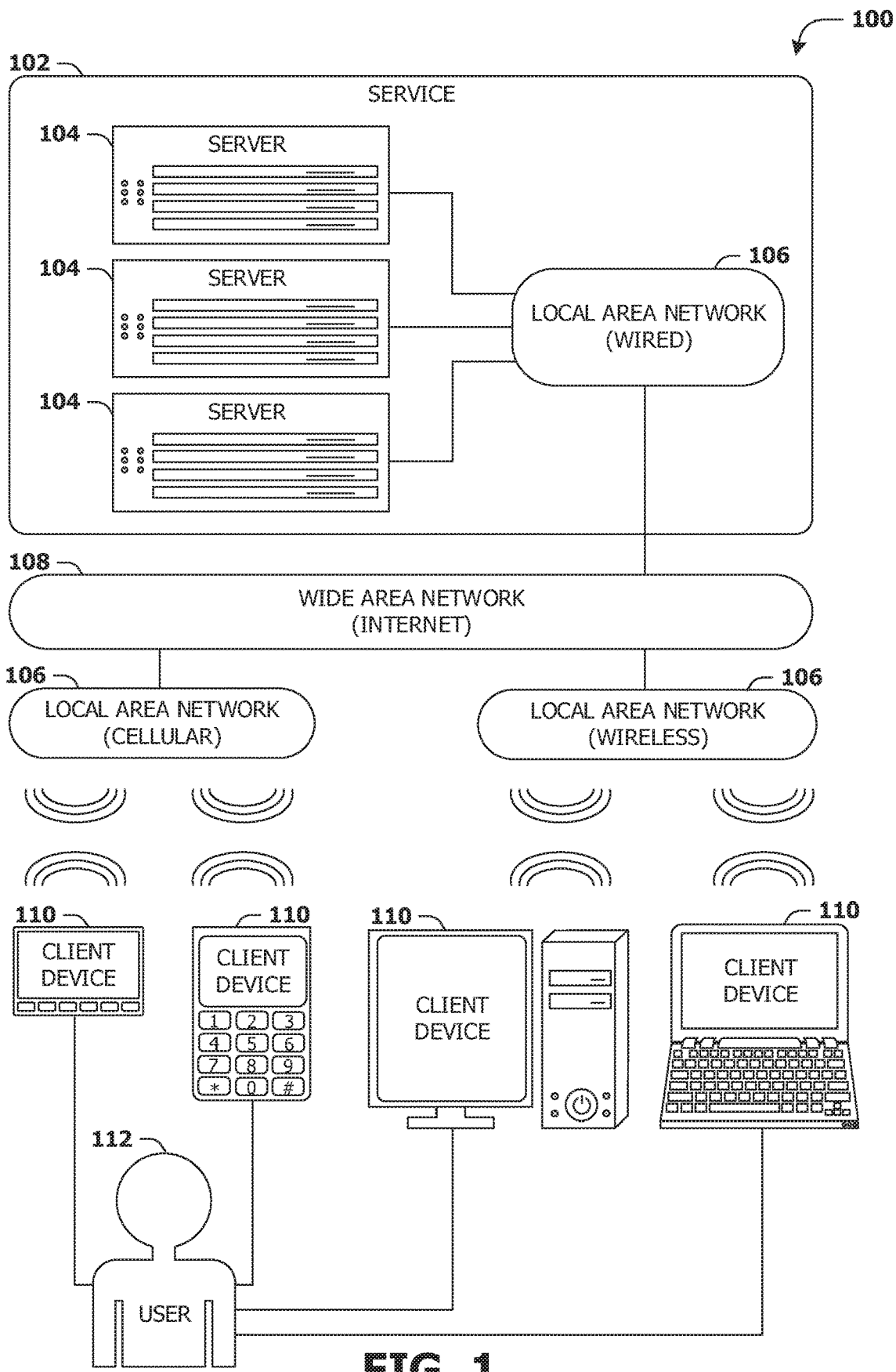
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fiber Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
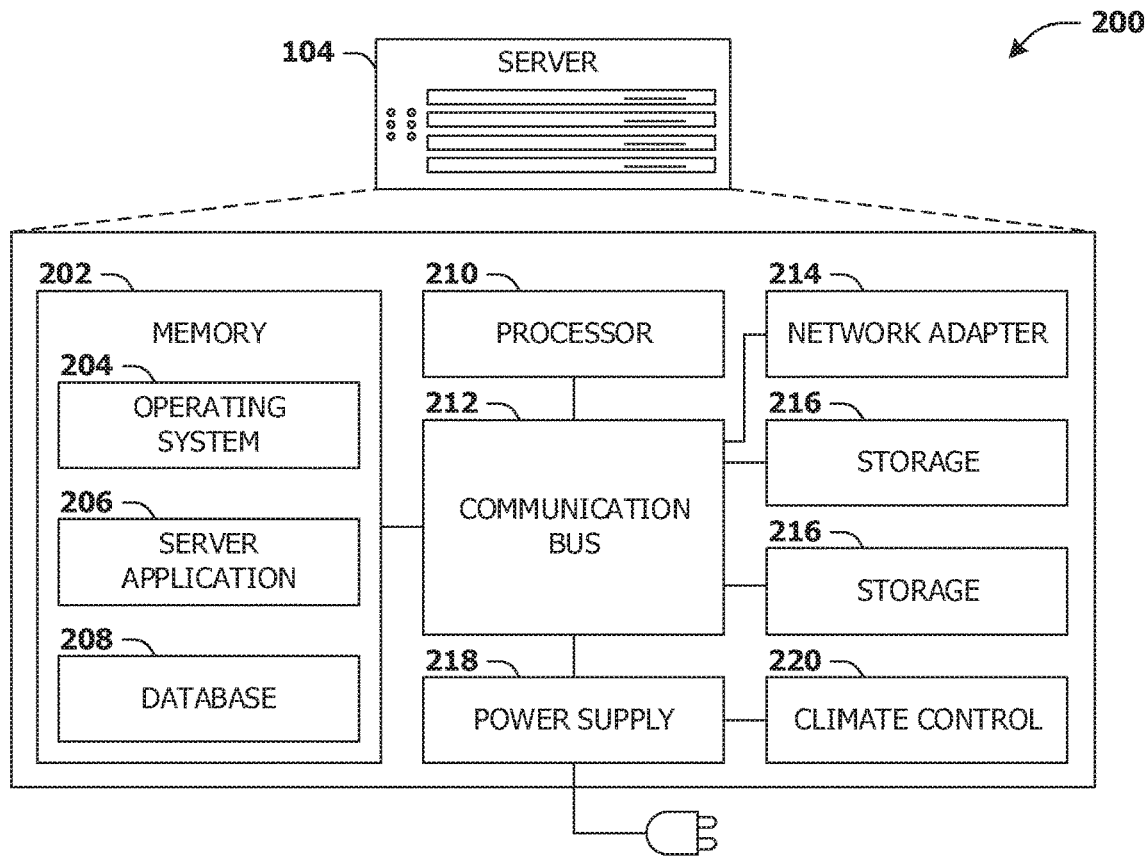
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
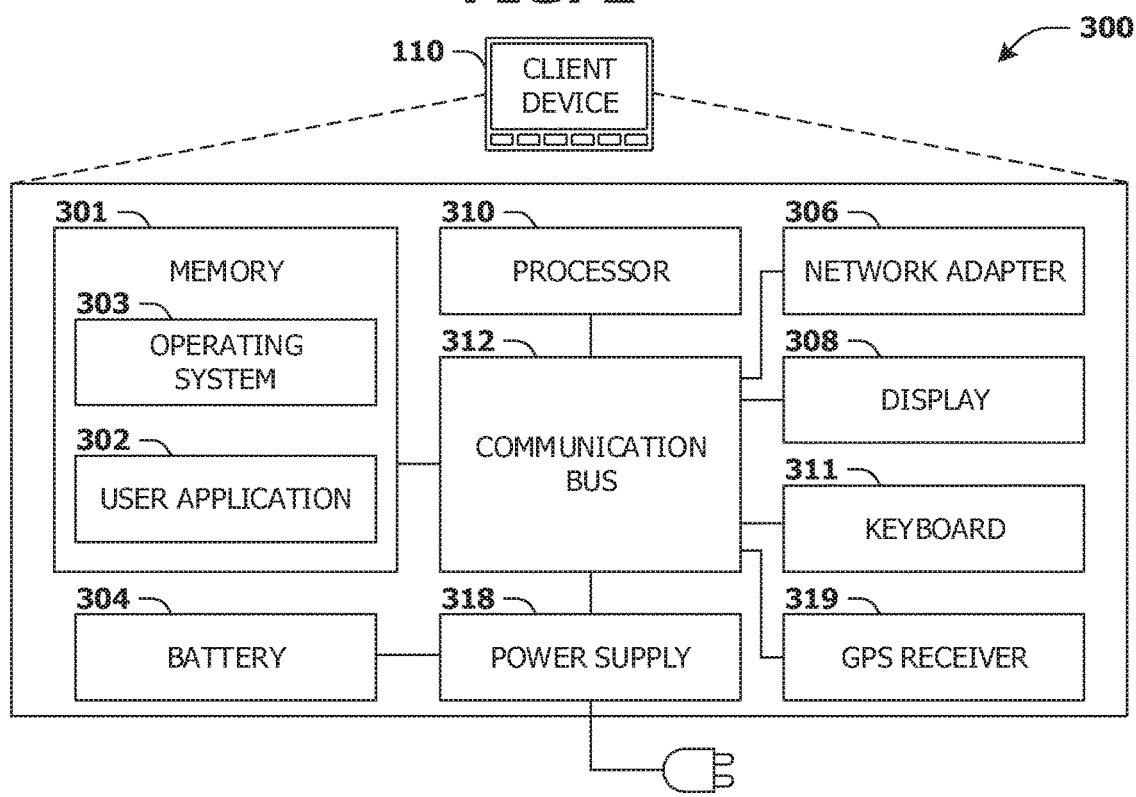
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic architecture diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more computing devices and/or techniques are provided for determining primary languages of users and/or selecting content for transmission to users based upon the primary languages. For example, a user may access and/or interact with a service, such as a browser, an application, software, etc. that provides for viewing and/or downloading web pages and/or content from a server (e.g., of a website, the application, etc.). In some examples, the server may not have access to language preference data associated with the user (e.g., user-defined language preferences). A first content item associated with a first language (e.g., German) may be presented to the user. For example, the first content item may comprise content in the first language. However, the user may not be familiar with the first language and/or the user may have a language preference for a second language (e.g., Japanese). As a result, the user may not be able to understand/interpret the first content item. Thus, in accordance with one or more of the techniques presented herein, a profile associated with the user (and/or one or more devices associated with the user) may be generated. The profile may comprise indications of content items presented to the user (and/or transmitted to the one or more devices) and/or indications of web pages associated with the content items. The indications of the content items and/or the indications of the web pages may be analyzed to select the second language (e.g., Japanese) as a primary language of the profile (and/or the one or more devices). Content items associated with the second language (e.g., Japanese) may be presented to the user (e.g., and/or transmitted to the one or more devices).

Figure 4:
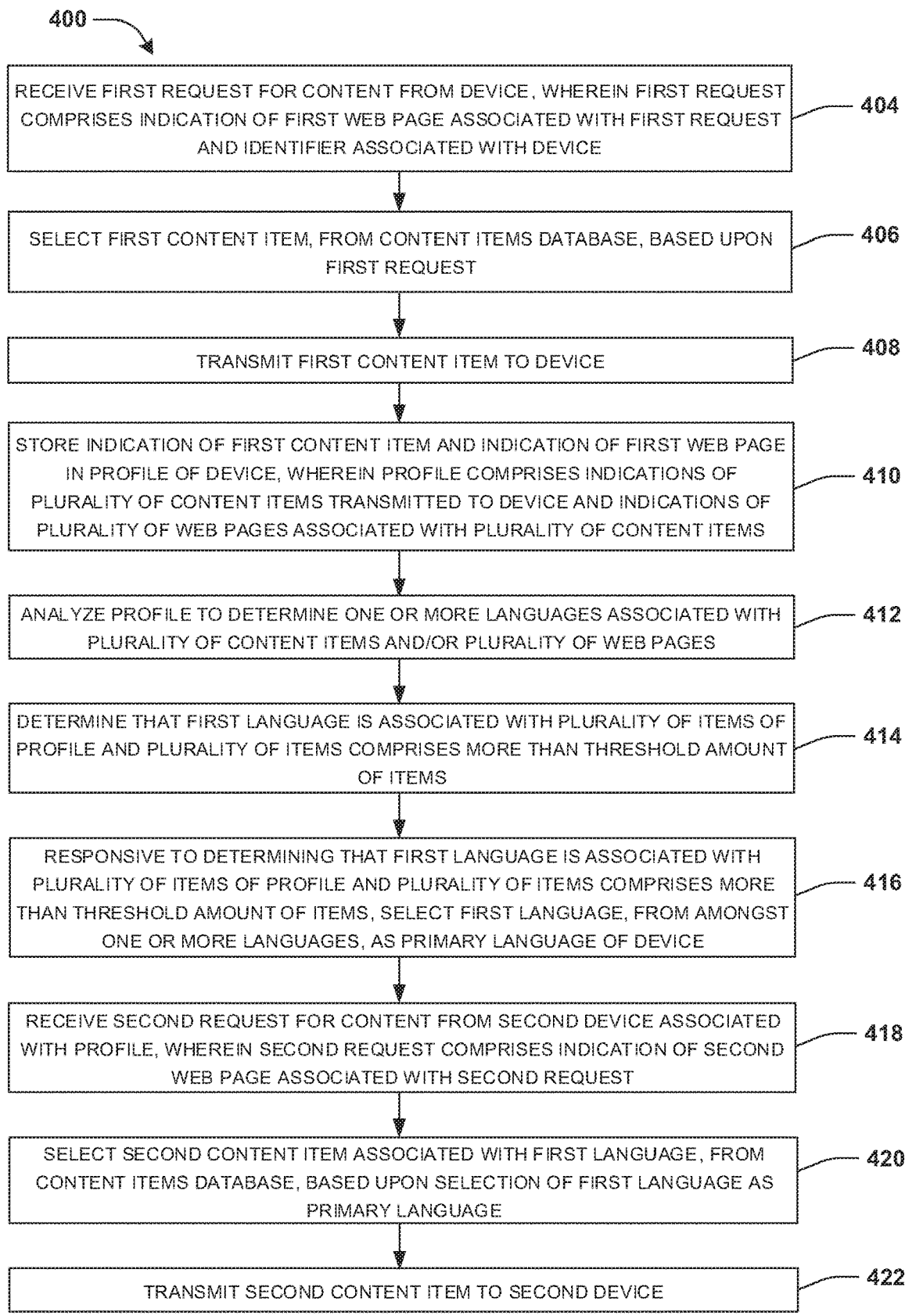
FIG. 4 is a flow chart illustrating an example method for selecting primary languages of users and/or selecting content for transmission to the users based upon the primary languages is illustrated.

An embodiment of selecting primary languages of users and/or selecting content for transmission to the users based upon the primary languages is illustrated by an example method 400 of FIG. 4. A user, such as user Jill, (and/or a client device associated with the user) may access and/or interact with a service, such as a browser, an application (e.g., a web application, a mobile application, etc.), software, etc. that provides for viewing and/or downloading web pages and/or content from one or more first servers (e.g., of a website, the application, etc.). For example, a first web page (e.g., of the website) may be accessed by the client device. For example, the first web page may be accessed using the browser of the client device, using the application of the client device and/or using the software of the client device.

In some examples, the first web page may be accessed responsive to a selection of a link (e.g., a hyperlink) to the first web page. For example, the link to the first web page may be comprised within a document, text, a web page, etc. The link to the first web page may be selected using a touchscreen (of the client device), one or more switches (e.g., one or more buttons), a conversational interface (e.g., a voice recognition and natural language interface), etc. Alternatively and/or additionally, the first web page may be accessed responsive to inputting a web address (e.g., a uniform resource locator (URL)) corresponding to the first web page. For example, the web address may be inputted into an address bar (of the browser, the application, etc.) using the touchscreen, the one or more switches, the conversational interface, etc.

In some examples, the first web page may be associated with a content system. The content system may provide content items to be presented via the first web page (and/or other web pages associated with the content system).

For example, the content system may be associated with a service for providing content items to be presented in one or more locations throughout web pages of the website (e.g., one or more areas of the web pages of the website configured for presentation of content items). In some examples, the content system is associated with an advertising system (e.g., an online advertising system) wherein one or more entities associated with the website may receive compensation (e.g., payment) for enabling the content system to provide content items to be presented throughout the web pages of the website. Alternatively and/or additionally, the content system may not be associated with an advertising system.

At 404, a first request for content may be received from the client device. The first request may be received by the one or more first servers associated with the first web page (and/or the website). Alternatively and/or additionally, the first request may be received by one or more second servers associated with the content system. In some examples, the one or more first servers may be the same as the one or more second servers (e.g., the content system and the website may employ a single set of servers). Alternatively and/or additionally, the one or more first servers may be different than the one or more second servers (e.g., the content system and the website may employ separate sets of servers). In some examples, the first request may not comprise language preference data (e.g., user-defined language preferences). Alternatively and/or additionally, there may not be language preference data corresponding to the user and/or the client device stored in the one or more first servers and/or the one or more second servers.

In some examples, the first request may be transmitted by the client device (e.g., to the one or more first servers and/or the one or more second servers), responsive to the client device accessing the first web page. Alternatively and/or additionally, the first request may be transmitted to the one or more second servers (associated with the content system) by the one or more first servers (associated with the first web page), responsive to the client device accessing the first web page.

In some examples, the first request may comprise an indication of the first web page. For example, the first request may comprise the web address and/or a representation of the web address (e.g., a modified version of the web address, a shortened version of the web address, etc.).

Alternatively and/or additionally, the first request may comprise an identifier associated with the client device. For example, the identifier may comprise an identification number associated with the client device, a network of the client device, the browser of the client device, the application of the client device, etc. In some examples, the identifier may be comprised within a cookie associated with the client device and/or the user. For example, the cookie may be comprised within the first request. In some examples, the identifier may comprise an Internet Protocol address (IP address), a media access control address (MAC address), etc.

At 406, a first content item may be selected based upon the first request. In some examples, the first content item may be selected from the content items database. For example, the content items database may be stored on the one or more first servers and/or the one or more second servers. In some examples, each content item in the content items database may be linked with one or more identifiers identifying one or more topics and/or one or more interests of a target audience associated with the content item, one or more demographic parameters of the target audience associated with the content item, one or more specifications of a file-size, file-type, etc. of the content item, etc.

In some examples, the first content item (and/or content items of the content items database) may be associated with (and/or may comprise) an advertisement (and/or the content items of the content items database may be associated with a plurality of advertisements). The first content item may be selected based upon a determination that the user is likely to favor, respond to, make a purchase due to and/or act upon the advertisement (and/or that the user matches a target audience associated with the advertisement).

For example, the first content item may be selected based upon one or more demographic parameters (e.g., age, income, etc.) of the user. Alternatively and/or additionally, the first content item may be selected based upon past behavior of the user and/or one or more other users associated with the client device, the network of the client device, the browser of the client device, the application of the client device, etc. Alternatively and/or additionally, the first content item may be selected based upon past usage of the client device, and/or usage of other client devices associated with the network, other client devices associated with the user, etc.

Alternatively and/or additionally, the first content item (and/or content items of the content items database) may be associated with media other than an advertisement. For example, the first content item may be a graphical object, text, a link to a different web page and/or a different website, a video clip, etc. associated with the first web page.

At 408, the first content item may be transmitted to the client device. For example, the first content item may be presented (e.g., to the user) via the client device (e.g., automatically) (e.g., while the first web page is accessed by the client device and/or while the user interacts with the first web page).

At 410, an indication of the first content item and/or the indication of the first web page (and/or a second indication of the first web page different from the indication of the first web page) may be stored in a profile of the client device (and/or the user, the network, etc.). In some examples, the profile may be identified based upon the identifier. For example, the profile may comprise (a representation of) the identifier. The identifier (comprised within the request) may be compared with a plurality of (representations of) identifiers comprised within a plurality of profiles to determine that the first request and/or the identifier is associated with the profile. In some examples, the profile may be stored on the one or more second servers (e.g., and/or the one or more first servers, the client device, etc.).

In some examples, the indication of the first web page (and/or the second indication of the first web page) may be stored in the profile prior to the indication of the first content item being stored in the profile. For example, the indication of the first web page (and/or the second indication of the first web page) may be stored in the profile responsive to receiving the first request and/or prior to selecting the first content item (and/or prior to transmitting the first content item to the client device).

Alternatively and/or additionally, the indication of the first web page (and/or the second indication of the first web page) and the indication of the first content item may be stored in the profile consecutively and/or simultaneously. Alternatively and/or additionally, (merely) the indication of the first web page (and/or the second indication of the first web page) may be stored in the profile and the indication of the first content item may not be stored in the profile.

The profile may comprise indications of a plurality of content items transmitted to the client device and/or indications of a plurality of web pages associated with the plurality of content items. For example, each web page of the plurality of web pages may have (previously) been accessed by (e.g., the browser and/or a second browser of) the client device (and/or a different client device associated with the user and/or the network). Each web page of the plurality of web pages may be associated with the content system. For example, the one or more second servers (of the content system) may have (previously) received a plurality of requests for content comprising the identifier and/or indications of (e.g., each web page of) the plurality of web pages. In some examples, each content item of the plurality of content items may have been presented (e.g., using the client device and/or a different client device associated with the profile) (e.g., automatically) while accessing the plurality of web pages.

In some examples, the profile may comprise a data structure comprising indications of each content item of the plurality of content items and/or indications of each web page of the plurality of web pages. For example, the profile may comprise a list of requests for content corresponding to the plurality of requests for content. Each set (e.g., grouping, row, etc.) of the list of requests may comprise an indication of a time of receipt of a request for content (e.g., a time that the request for content was received and/or transmitted), an indication of a content item (of the plurality of content items) associated with the request for content (e.g., wherein the content item may have been transmitted responsive to receiving the request for content) and/or an indication of a web page (of the plurality of web pages) associated with the request for content (e.g., wherein an indication of the web page may have been comprised within the request for content). In some examples, each set of the list of requests (merely) comprises an indication of a time of receipt of a request for content and an indication of a web page associated with the request for content (e.g., the list of requests and/or the profile may not comprise indications of the plurality of content items). In some examples, the profile may include information determined to be associated with each request for content and/or the content items and/or webpages associated with each request for content, such as a topic, a person, a character, a theme, a location, a gender, an ethnicity, an age, a timespan, etc.

At 412, the profile may be analyzed to determine one or more languages associated with the plurality of content items and/or the plurality of web pages. For example, each web page of the plurality of web pages may be analyzed to determine one or more languages associated with each web page. For example, each web page of the plurality of web pages may be analyzed by using one or more language detection techniques (e.g., and/or algorithms) to determine one or more languages associated with each web page of the plurality of web pages. In some examples, a plurality of sets of language indications may be generated based upon the plurality of web pages. For example, each set of language indications of the plurality of sets of language indications may comprise one or more language indications of a web page of the plurality of web pages. In some examples, the plurality of sets of language indications may be stored in the profile and/or a data structure separate from the profile.

In some examples, the first web page may be analyzed and/or it may be determined that the first web page comprises content in a first language and/or content in a second language. Accordingly, a first set of language indications corresponding to the first web page may be generated. For example, the first set of language indications may comprise indications of the first language and/or the second language. Alternatively and/or additionally, a second web page of the plurality of web pages may be analyzed and/or it may be determined that the second web page comprises content in the second language and/or content in a third language. Accordingly, a second set of language indications corresponding to the second web page may be generated. For example, the second set of language indications may comprise indications of the second language and/or the third language. In some examples, the plurality of sets of language indications corresponding to the plurality of web pages may be analyzed to determine the one or more languages associated with the profile and/or an amount of items associated with each language of the one or more languages. Alternatively and/or additionally, each indication of the indications of the plurality of content items may comprise and/or may link to one or more identifiers of one or more languages of a corresponding content item.

At 414, it may be determined that the first language is associated with a plurality of items of the profile and/or the plurality of items comprises more than a threshold amount of items. In some examples, the plurality of items may comprise web pages of the plurality of web pages. For example, (merely) the plurality of web pages may be analyzed to determine the plurality of items that the first language is associated with. Alternatively and/or additionally, the plurality of items may comprise content items of the plurality of content items. For example, (merely) the plurality of content items may be analyzed to determine the plurality of items that the first language is associated with. Alternatively and/or additionally, the plurality of items may comprise web pages of the plurality of web pages and content items of the plurality of content items. For example, the plurality of web pages and the plurality of content items may be analyzed to determine the plurality of items that the first language is associated with.

In some examples, the plurality of items (associated with the first language) may be compared with the threshold amount of items to determine whether the plurality of items is higher than the threshold amount of items. In some examples, the threshold amount of items may be a number of items. For example, the threshold amount of items may be 100 items, 150 items, 175 items, etc.

Alternatively and/or additionally, the threshold amount of items may be a proportion of items (e.g., and/or a percentage of items) of the profile. For example, the threshold amount of items may be (25%) of items of the profile, (30%) of items of the profile, (50%) of items of the profile, (75%) of items of the profile, etc.

Alternatively and/or additionally, it may be determined that the plurality of items comprises more than the threshold amount of items by determining that the plurality of items comprises more items than items associated with (other) languages associated with the profile (other than the first language).

In some examples, it may be determined that more than one language is associated with items of the profile that exceed the threshold amount of items. For example, the second language may be associated with a second plurality of items of the profile. In some examples, the second plurality of items may comprise more than the threshold amount of items. Accordingly, languages associated with items of the profile (that exceed the threshold amount of items) may be assigned scores. For example, a first score may be assigned to the first language and/or a second score may be assigned to the second language. In some examples, the scores are assigned to the languages (associated with items of the profile) based upon an amount of items identified as being associated with a language, time elapsed since requests that are associated with items of the profile were received and/or interactions associated with content items.

For example, the first score may be generated based upon an amount of items of the plurality of items. For example, the first score may be determined based upon a first equation:

$$\text{language score} = \Sigma(\text{items associated with language})$$

For example, the plurality of items (that the first language is associated with) may comprise 20 items. Accordingly, the first score may be 20.

Alternatively and/or additionally, the first score (and/or the second score and/or other scores associated with other languages associated with the profile) may be generated based upon time elapsed since requests for content associated with the plurality of items were received. Alternatively and/or additionally, the first score may be generated based upon time elapsed since transmission of content items associated with the plurality of items and/or based upon time elapsed since web pages associated with the plurality of items were accessed. For example, the first score may be determined based upon a plurality of sets of items of the plurality of items, wherein each set of items of the plurality of sets of items may comprise items of the plurality of items associated with a defined period of time.

For example, a first set of items may be associated with a first period of time (e.g., a first day, a first hour, a first week, a first month, etc.). In some examples, the first set of items may be associated with requests for content that were transmitted and/or received within the first period of time. A second set of items may be associated with a second period of time (e.g., a second day, a second hour, a second week, a second month, etc.). In some examples, the second set of items may be associated with requests for content that were transmitted and/or received within the second period of time. A third set of items may be associated with a third period of time (e.g., a third day, a third hour, a third week, a third month, etc.). In some examples, the third set of items may be associated with requests for content that were transmitted and/or received within the third period of time.

For example, the first period of time may be at (and/or may be during) a present time (e.g., today, this hour, this week, this month, etc.). The second period of time may be at (and/or may be during) a previous time before the first period of time (e.g., a day before today, an hour before this hour, a week before this week, a month before this month, etc.). The third period of time may be at (and/or may be during) a second previous time before the second period of time (e.g., two days before today, two hours before this hour, two weeks before this week, two months before this month, etc.). In some examples, the first score may be not be generated based upon items (e.g., content items and/or web pages) associated with (requests for content that were received at) times before a threshold period of time (e.g., 30 days, 2 months, 180 days, etc.) prior to the present time.

For example, a plurality of scores may be generated. Each score of the plurality of scores may correspond to a set of items of the plurality of items. For example, each score of the plurality of scores may be determined using the first equation. For example, a first set score of the first set of items may be equal to an amount of items of the first set of items, a second set score of the second set of items may be equal to an amount of items of the second set of items, a third set score of the third set of items may be equal to an amount of items of the third set of items, etc.

In some examples, a plurality of weights may be applied to the plurality of scores. The plurality of weights may be applied to the plurality of scores based upon a decay factor. For example, the decay factor may be 0.99, 0.98, 0.97, 0.96, 0.95, 0.8, etc. In some examples, weights of the plurality of weights may be generated based upon a second equation:

$\text{weight} = d^i$, where d may correspond to the decay factor and/or i may correspond to a number of time periods elapsed since a period of time corresponding to a set of items.

For example, a first number of time periods elapsed since the first period of time (corresponding to the first set of items) may be 0 (e.g., because the first period of time may be at and/or during the present time). Accordingly, a first weight that may be applied to the first set score may be: $d^0=1$. In an example, the first set score (corresponding to the amount of items of the first set of items) may be 11. Accordingly, a first weighted set score of the first set of items may be generated by performing a mathematical operation to determine a combination (e.g., a product) of the first weight and the first set score. Thus, the first weighted set score may be equal to: $11 \times 1 = 11$.

A second number of time periods elapsed since the second period of time (corresponding to the second set of items) may be 1 (e.g., because the second period of time may be 1 time period before the first period of time). In the example, the decay factor may be 0.9. Accordingly, a second weight that may be applied to the second set score may be $0.9^1=0.9$. The second set score (corresponding to the amount of items of the second set of items) may be 20. Accordingly, a second weighted set score of the second set of items may be generated by performing a mathematical operation to determine a combination (e.g., a product) of the second weight and the second set score. Thus, the second weighted set score may be equal to: $20 \times 0.9 = 18$.

A third number of time periods elapsed since the third period of time (corresponding to the third set of items) may be 2 (e.g., because the third period of time may be before the second period of time). Accordingly, a third weight that may be applied to the third set score may be $0.9^2=0.81$. The third set score (corresponding to the amount of items of the third set of items) may be 24. Accordingly, a third weighted set score of the third set of items may be generated by performing a mathematical operation to determine a combination (e.g., a product) of the third weight and the third set score. Thus, the third weighted set score may be equal to: $24\times0.81=19.44$. In some examples, the first score (e.g., of the plurality of items and/or the first language) may be generated by performing a mathematical operation to determine a combination (e.g., a sum) of the first weighted set score (e.g., 11), the second weighted set score (e.g., 18), the third weighted set score (e.g., 19.44) and/or one or more (other) weighted set scores corresponding to one or more (other) sets of items of the plurality of items.

In some examples, the first score (and/or the second score and/or other scores associated with other languages associated with the profile) may be generated based upon interactions associated with content items associated with the plurality of items. For example, one or more interactions associated the first content item may be detected (e.g., by the client device). Responsive to detecting the one or more interactions, one or more indications of the one or more interactions may be transmitted to the one or more second servers (associated with the content system).

In some examples, the one or more indications of the one or more interactions may comprise an indication of a first interaction type, wherein the indication of the first interaction type indicates a selection of the first content item. For example, the first content item may be selected (e.g., clicked, pressed, etc.) via the client device using the touchscreen, the one or more switches (e.g., a mouse, a keyboard, buttons, etc.), the conversational interface, etc.

Alternatively and/or additionally, the one or more indications of the one or more interactions may comprise an indication of a second interaction type, wherein the indication of the second interaction type indicates that the first content item was presented by the client device. For example, the first content item may be presented by being displayed by a screen of the client device and/or by being outputted by a speaker of the client device.

Alternatively and/or additionally, the one or more indications of the one or more interactions may comprise an indication of a third interaction type, wherein the indication of the third interaction type may indicate that (merely) a portion (e.g., proportion, percentage, fraction, etc.) of the first content item was presented using the client device (e.g., and/or that a second portion (e.g., second proportion, second percentage, second fraction, etc.) of the first content item was not presented using the client device). For example, (merely) a first portion of the first content item, comprising a first proportion (e.g., 25%, 60%, etc.) of the first content item, may be presented using the client device (e.g., and/or a second portion (e.g., 75%, 40%, etc.) of the first content item may not be presented using the client device). Accordingly, the one or more indications of the one or more interactions may comprise an indication comprising the first proportion of the first content item that was presented using the client device.

In some examples, indications of a plurality of interactions, associated with content items of the plurality of content items, may be received (by the one or more second servers). The indications of the plurality of interactions may be stored in the profile. In some examples, a second plurality of weights may be assigned to the plurality of content items. For example, each weight of the second plurality of weights may be assigned to a content item of the plurality of content items.

In some examples, each weight of the second plurality of weights may be generated based upon an interaction type of one or more interactions associated with a content item. For example, a content item associated with one or more interactions corresponding to the first interaction type may be assigned a fourth weight. Alternatively and/or additionally, a content item associated with one or more interactions corresponding to the second interaction type may be assigned a fifth weight. Alternatively and/or additionally, a content item associated with one or more interactions corresponding to the third interaction type may be assigned a sixth weight.

In some examples, it may be determined that the first language is associated with a first set of content items (of the plurality of content items). A first set of weights may be assigned to the first set of content items based upon interactions associated with the first set of content items. Accordingly, the first score (assigned to the first language) may be generated based upon the first set of content items and/or the first set of weights (assigned to the first set of content items). Alternatively and/or additionally, it may be determined that the second language is associated with a second set of content items (of the plurality of content items). A second set of weights may be assigned to the second set of content items based upon interactions associated with the second set of content items. Accordingly, the second score (assigned to the second language) may be generated based upon the second set of content items and/or the second set of weights (assigned to the second set of content items).

At 416, the first language may be selected as a primary language of the client device (and/or the profile). In some examples, the primary language of the client device (and/or the profile) may be used to select content items for transmission to the client device (e.g., and/or a different client device associated with the profile).

For example, the first language may be selected as the primary language of the client device (and/or the profile) responsive to determining that the first language is associated with the plurality of items of the profile and/or that the plurality of items comprises more than the threshold amount of items. Alternatively and/or additionally, it may be determined that the second language is associated with the second plurality of items of the profile and/or that the second plurality of items may comprise more than the threshold amount of items. Accordingly, the first score (assigned to the first language) and/or the second score (assigned to the second language) (and/or other scores associated with other languages) may be compared (with each other) to determine which score has a higher value (e.g., and/or a highest value). For example, the first score of the first language may be higher than the second score of the second language. Responsive to determining that the first score of the first language is higher than the second score of the second language, the first language may be selected as the primary language of the device and/or the profile. The primary language may be stored in the profile and/or separately from the profile.

In some examples, a plurality of languages may be selected as primary languages of the profile. In some examples, the plurality of languages may be selected as primary languages responsive to determining that the user may be familiar with and/or may understand each language of the plurality of languages. For example, responsive to determining that the plurality of languages are each associated with items that exceed a second threshold amount of items and/or that the plurality of languages are each assigned scores that exceed a threshold score, each of the plurality of languages may be selected as primary languages of the profile. In some examples, the second threshold amount of items may be equal to the threshold amount of items. Alternatively and/or additionally, the second threshold amount of items may be higher than the threshold amount of items.

In some examples, a second client device may be associated with the profile, the user and/or the network of the client device. In some examples, a third web page (e.g., of the website and/or of a different website) may be accessed by the second client device. For example, the third web page may be accessed using a second browser of the second client device, a second application of the second client device, etc.

In some examples, the third web page may be accessed responsive to a selection of a second link to the third web page. For example, the second link to the third web page may be comprised within a document, text, a web page, etc. The second link to the third web page may be selected using a second touchscreen (of the second client device), one or more second switches (e.g., one or more buttons), a second conversational interface (e.g., a voice recognition and natural language interface), etc. Alternatively and/or additionally, the third web page may be accessed responsive to inputting a second web address (e.g., a URL) corresponding to the third web page. For example, the second web address may be inputted into a second address bar (of the second browser, the second application, etc.) using the second touchscreen, the one or more second switches, the second conversational interface, etc.

In some examples, the third web page may be associated with the content system. The content system may provide content items to be presented via the third web page (and/or other web pages associated with the content system). At 418, a second request for content may be received from the second client device. In some examples, the second client device may be the same as the client device. Alternatively and/or additionally, the second client device may be different than the client device. In some examples, the second client device may be associated with the profile, the user and/or the network of the client device. In some examples, the second request may comprise the identifier and/or a second identifier associated with the second client device, a second network of the second client device, a second browser of the client device, a second application of the second client device, etc. In some examples, the second network (of the second client device) may be the same as the network (of the client device). Alternatively and/or additionally, the second network may be different than the network.

In some examples, the second request may be transmitted (e.g., to the one or more second servers and/or one or more third servers associated with the third web page) by the second client device, responsive to accessing the third web page. Alternatively and/or additionally, the second request may be transmitted to the one or more second servers (associated with the content system) by the one or more third servers (associated with the third web page), responsive to the second client device accessing the third web page.

In some examples, the second request may comprise an indication of the third web page. For example, the second request may comprise the second web address and/or a representation of the second web address (e.g., a modified version of the second web address, a shortened version of the second web address, etc.).

At 420, a second content item, associated with the first language, may be selected from the content items database, based upon the selection of the first language as the primary language (for the profile). For example, the second content item may comprise content in the first language. At 422, the second content item may be transmitted to the second client device. For example, the second content item may be presented (e.g., to the user and/or a second user) via the second client device (e.g., automatically) (e.g., while the third web page is accessed by the second client device and/or while the user and/or the second user interacts with the third web page).

In some examples, responsive to receiving the second request (for content), an indication of the second content item and/or the indication of the third web page (and/or a second indication of the third web page) may be stored in the profile of the device. In some examples, the profile may be analyzed to select (a language as) the primary language.

In some examples, responsive to receiving a request for content associated with the profile, the profile may be updated and/or analyzed to select an up-to-date version of the primary language. For example, responsive to indications of items (e.g., indications of content items and/or web pages) being added to the profile, a different language may be selected as the primary language based upon the profile modified with the additions. For example, responsive to receiving the first request (for content), the indication of the first web page (and/or the second indication of the first web page) may be stored in the profile and/or the profile may be analyzed to select (e.g., and/or update) the primary language. Accordingly, the first content item may be selected (e.g., for transmission to the client device) based upon of the primary language.

Alternatively and/or additionally, the profile may be analyzed to select an updated version of the primary language periodically. For example, the profile may be analyzed to select an updated version of the primary language (merely) once per minute, once per 30 minutes, once per hour, once per two hours, once per day, once per three days, once per week, once per month, once every 5 requests for content received (by the one or more second servers), once every 10 requests for content received, once every 100 requests for content received, etc.

In some examples, a fourth web page may be accessed by a third client device, associated with a third user. For example, the fourth web page may be accessed using a third browser of the fourth client device, a third application of the third client device, etc. In some examples, the third user may have a user account associated with the content system and/or with a third website associated with the fourth web page.

In some examples, responsive to accessing the fourth web page, the third client device may transmit a third request for content to the one or more second servers (associated with the content system) (and/or one or more fourth servers associated with the fourth web page). Alternatively and/or additionally, the third request may be transmitted to the one or more second servers by the one or more fourth servers responsive to the third client device accessing the fourth web page.

In some examples, the third request may comprise a user identification of the user account (of the third user). In some examples, a set of settings of the user account may be analyzed to identify a language preference associated with the user account. The language may comprise an indication of a fourth language. In some examples, a third content item may be selected from the content items database based upon the fourth language. For example, the third content item may comprise content in the fourth language. The third content item may be transmitted to the third client device. For example, the third content item may be presented (e.g., to the third user) via the third client device (e.g., automatically) (e.g., while the fourth web page is accessed by the third client device and/or while the third user interacts with the fourth web page).

FIGS. 5A-5F illustrate examples of a system 501 for selecting primary languages for users and/or selecting content for transmission to the users based upon the primary languages. A user, such as user James, may access and/or interact with a service, such as a browser, an application, software, etc. that provides a platform for viewing and/or downloading web pages and/or content from one or more servers (e.g., of a website, the application, etc.), on a device 500 of the user.

Figure 5A:
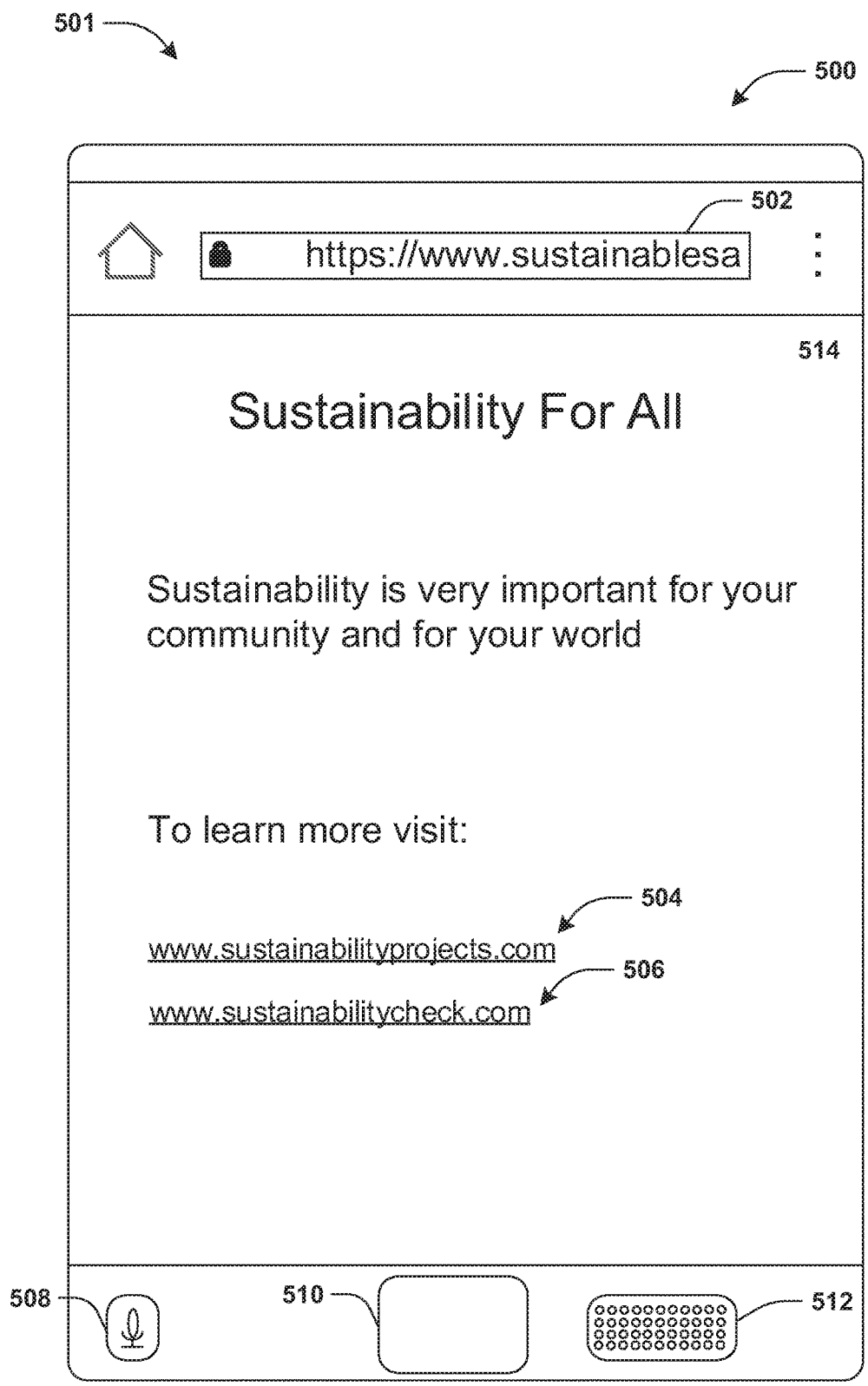
FIG. 5A is a component block diagram illustrating an example system for selecting primary languages for users and/or selecting content for transmission to the users based upon the primary languages, where a device presents and/or accesses a first web page using a browser of the device.

FIG. 5A illustrates the device 500 presenting and/or accessing a first web page 514 using the browser of the device 500. The device 500 may comprise a button 510, a microphone 508 and a speaker 512. The browser may comprise an address bar 502 comprising a web address (e.g., a URL) of the first web page 514. The first web page 514 may comprise a first link 504 to a second web page 546 and/or a second link 506 to a third web page. In some examples, the first link 504 may be selected using a touchscreen of the device 500 (e.g., wherein the user may press on an area of the touchscreen that the first link 504 is displayed), one or more switches (e.g., wherein the user may use a keyboard and/or a set of buttons to select the first link 504), a conversational interface of the device 500, etc.

Figure 5B:
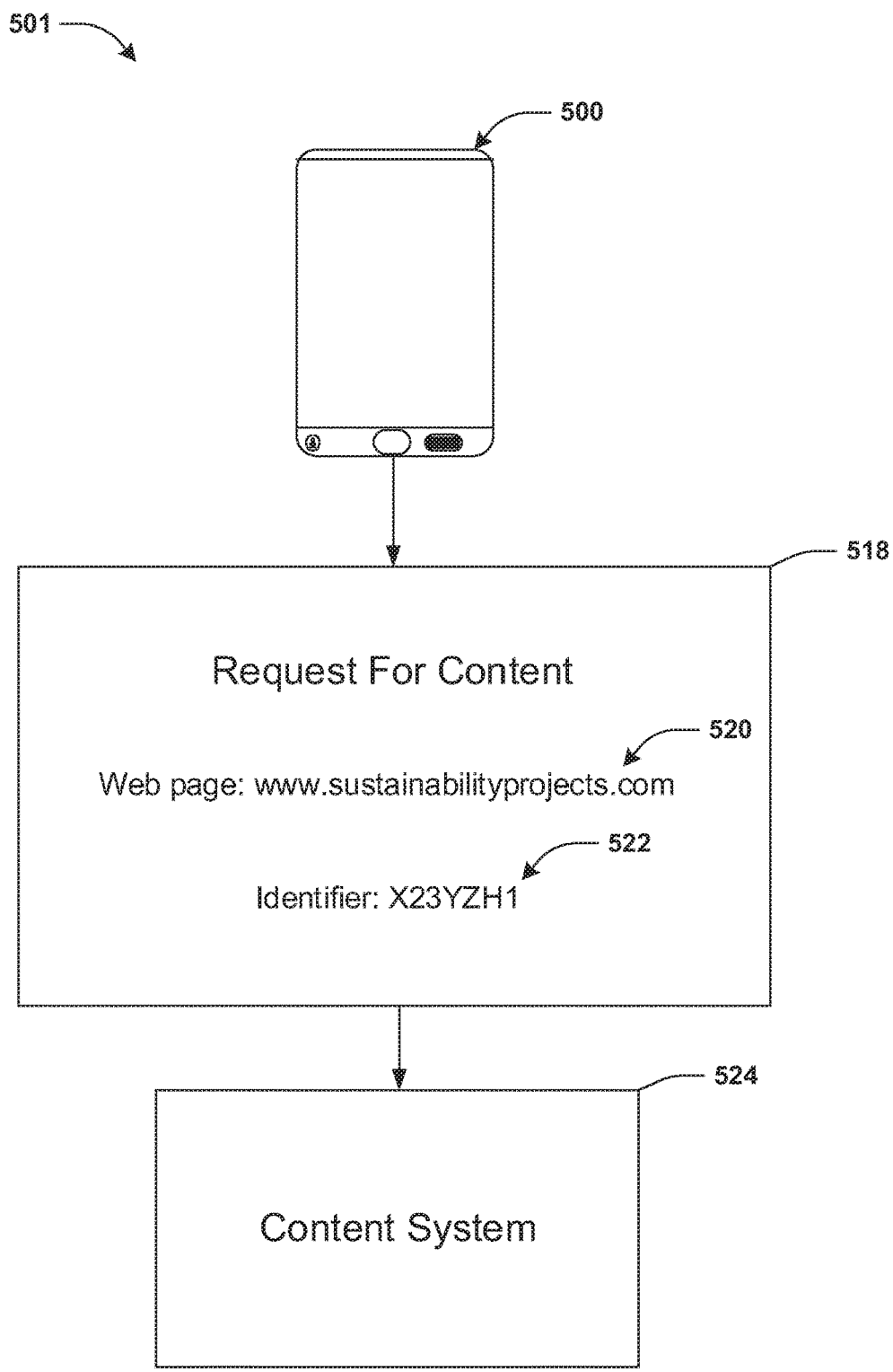
FIG. 5B is a component block diagram illustrating an example system for selecting primary languages for users and/or selecting content for transmission to the users based upon the primary languages, where a first request for content is transmitted by a device to one or more first servers associated with a content system.

FIG. 5B illustrates a first request 518 for content being transmitted by the device 500 to one or more first servers 524 associated with a content system. In some examples, the content system may be associated with the second web page 546. For example, the content system may provide content items to be presented via the second web page 546. In some examples, the one or more first servers 524 may be the same as one or more second servers associated with a second website of the second web page 546. Alternatively and/or additionally, the one or more first servers 524 may be different than the one or more second servers.

In some examples, the first request 518 may be transmitted to the one or more first servers 524 by the device 500 responsive to the device 500 accessing the second web page 546. In some examples, the first request 518 may not comprise language preference data (e.g., user-defined language preferences). Alternatively and/or additionally, there may not be language preference data corresponding to the user and/or the device 500 stored in the one or more first servers 518 and/or the one or more second servers.

In some examples, the first request 518 may comprise a first indication 520 of the second web page 546. The first indication 520 may comprise a second web address of the second web page 546 and/or a representation of the second web address (e.g., a modified version of the second web address, a shortened version of the second web address, etc.). Alternatively and/or additionally, the first request 518 may comprise an identifier 522 associated with the device 500. For example, the identifier 522 may comprise an identification number associated with the device 500, a network of the device 500, the browser of the device 500, etc. In some examples, the identifier 522 may be comprised within a cookie associated with the device 500 and/or the user. For example, the cookie may be comprised within the first request 518. In some examples, the identifier 522 may comprise an IP address, a MAC address, etc.

Figure 5C:
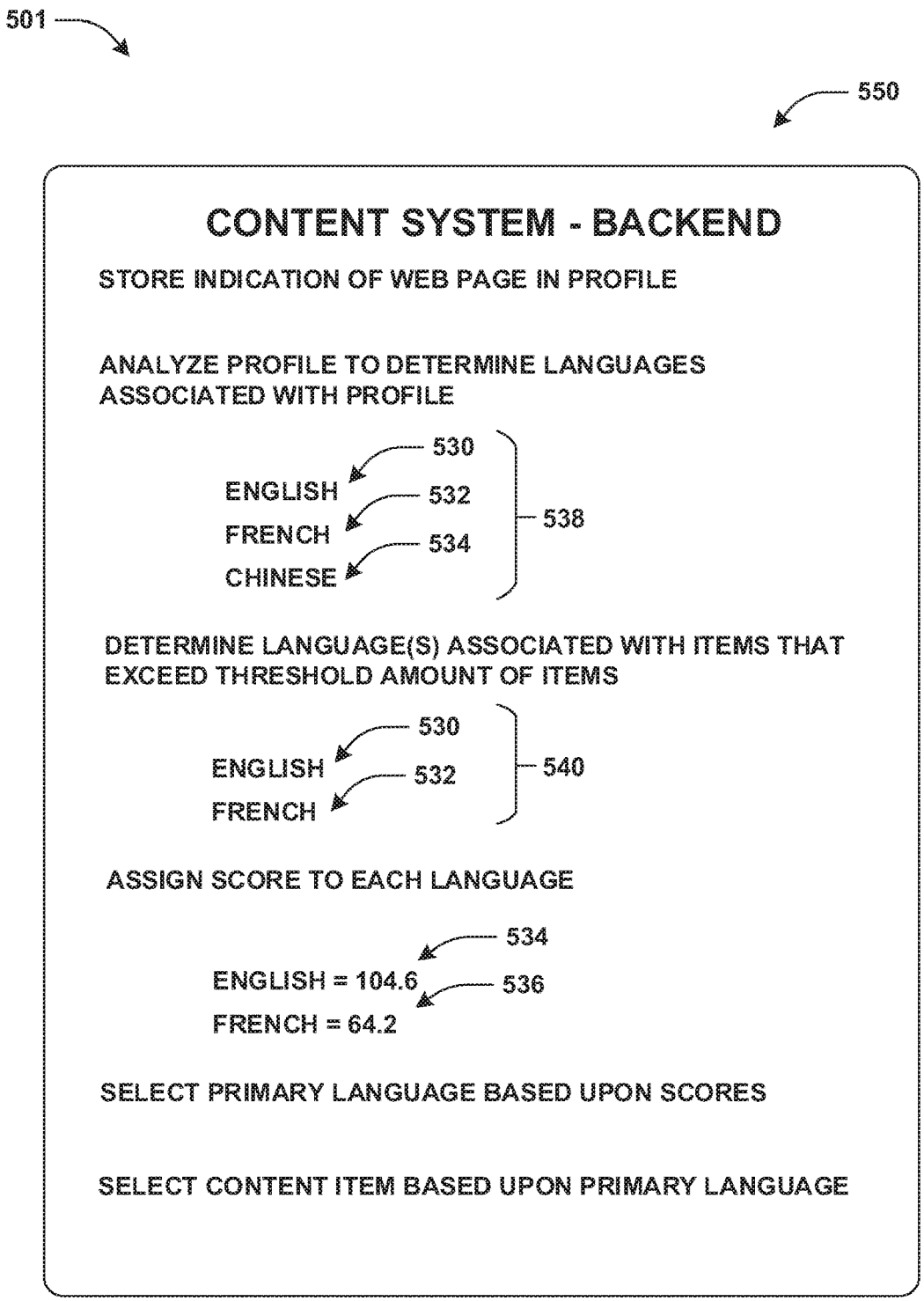
FIG. 5C is a component block diagram illustrating an example system for selecting primary languages for users and/or selecting content for transmission to the users based upon the primary languages, where a backend system selects a first content item responsive to receiving a first request.

FIG. 5C illustrates a backend system 550 (e.g., on the one or more first servers 524, on the one or more second servers, etc.) that may select a first content item 548 responsive to (the one or more first servers 524) receiving the first request 518. In some examples, the indication 520 of the second web page 546 (and/or a second indication of the second web page 546 different from the indication of the second web page 546) may be stored in a profile of the device 500 (e.g., and/or the user, the network, etc.). In some examples, the profile may be identified based upon the identifier 522. In some examples, the profile may be stored on the one or more first servers 524.

The profile may comprise indications of a plurality of content items transmitted to the device 500 and/or indications of a plurality of web pages associated with the plurality of content items. For example, each web page of the plurality of web pages may have (e.g., previously) been accessed by (e.g., the browser and/or a second browser of) the device 500 (and/or a different device associated with the user and/or the network).

The profile may be analyzed to determine one or more first languages 538 associated with the plurality of content items and/or the plurality of web pages. For example, each web page of the plurality of web pages may be analyzed by using one or more language detection techniques (e.g., and/or algorithms) to determine that a first language 530 (English), a second language 532 (French) and/or a third language 534 (Chinese) are associated with the profile.

The profile may be analyzed to determine one or more second languages 540 that are associated with items (e.g., content items and/or web pages) that exceed a threshold amount of items. For example, the first language 530 may be associated with a first plurality of items having a first amount of items (e.g., 206 items), the second language 532 may be associated with a second plurality of items having a second amount of items (e.g., 184 items) and/or the third language 534 may be associated with a third plurality of items having a third amount of items (e.g., 16 items). The threshold amount of items may be 50 items (and/or a different value). Accordingly, the first amount of items, the second amount of items and/or the third amount of items may be compared with the threshold amount of items to determine that the first amount of items and/or the second amount of items are more than the threshold amount of items and/or that the third amount of items is less than the threshold amount of items. Accordingly, the one or more second languages 540 may comprise the first language 530 and/or the second language 532.

In some examples, scores may be assigned to the one or more second languages 540. The scores may be assigned based upon an amount of items identified as associated with a language (e.g., of the one or more second languages 540), time elapsed since requests associated with items of the profile were received and/or interactions associated with content items. For example, the first language 530 may be assigned a first score 534 (104.6) and/or the second language 532 may be assigned a second score 536 (64.2). The first score 534 and the second score 536 may be compared (with each other) to determine which score has a higher value. Accordingly, it may be determined that the first score 534 is higher than the second score 536.

Accordingly, responsive to determining that the first score 534 is higher than the second score 536, the first language 530 may be selected as a primary language of the device 500 and/or the profile. In some examples, the first content item 548, associated with the first language 530, may be selected from a content items database, based upon the selection of the first language 530 as the primary language. For example, the first content item 548 may comprise content in the first language. The first content item 548 may be transmitted to the device 500. For example, the first content item 548 may be presented via the device 500 (e.g., automatically) while the second web page 546 is accessed by the device 500 (e.g., and/or while the user interacts with the second web page 546).

Figure 5D:
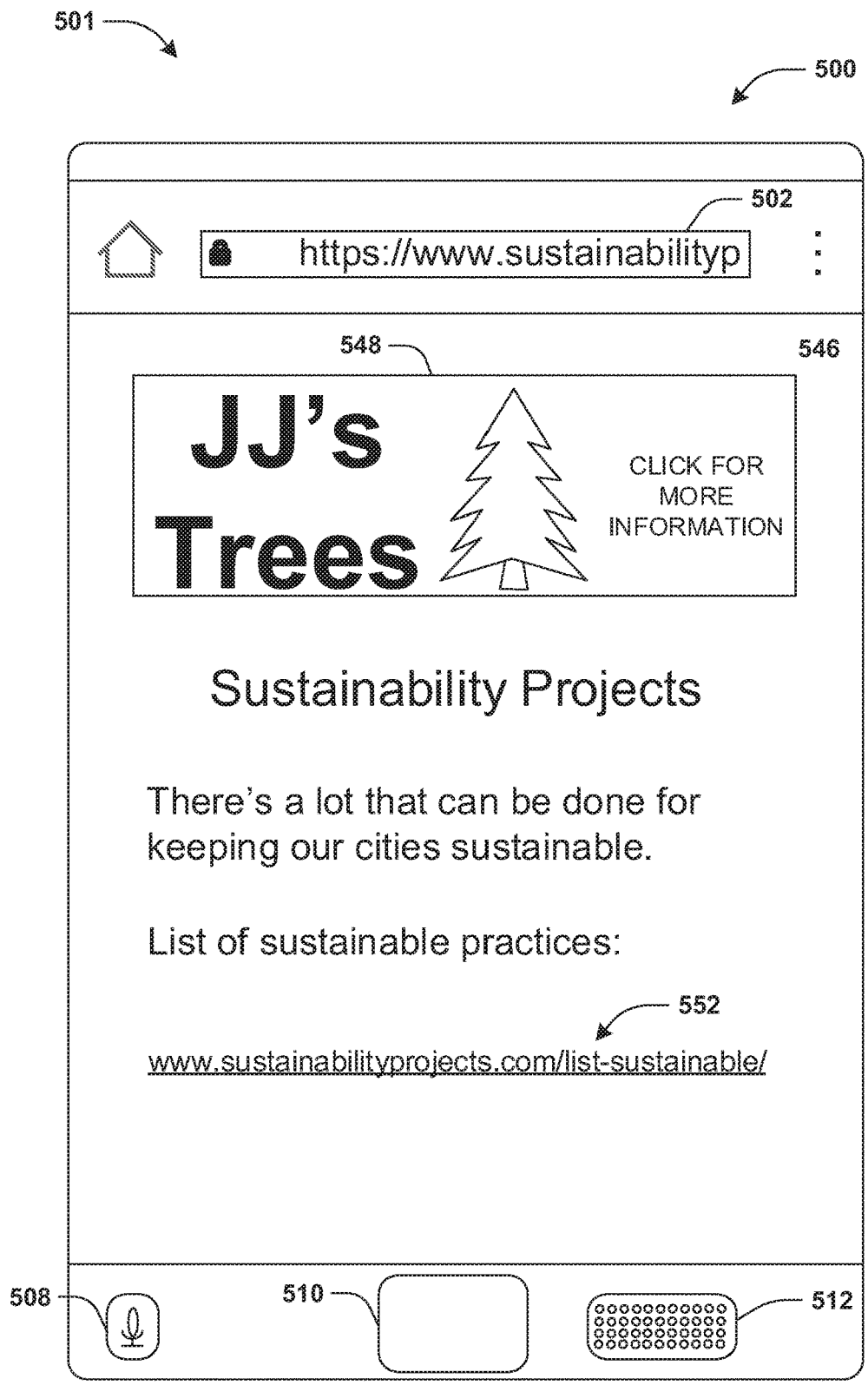
FIG. 5D is a component block diagram illustrating an example system for selecting primary languages for users and/or selecting content for transmission to the users based upon the primary languages, where a device presents and/or accesses a second web page comprising a first content item.

FIG. 5D illustrates the device 500 presenting and/or accessing the second web page 546 comprising the first content item 548. In some examples, the first content item 548 may comprise a (e.g., selectable) graphical object. In some examples, the second web page 546 may comprise a third link 552 to a fourth web page 566. In some examples, the third link 552 may be selected using the touch screen of the device 500, the one or more switches, the conversational interface, etc.

Figure 5E:
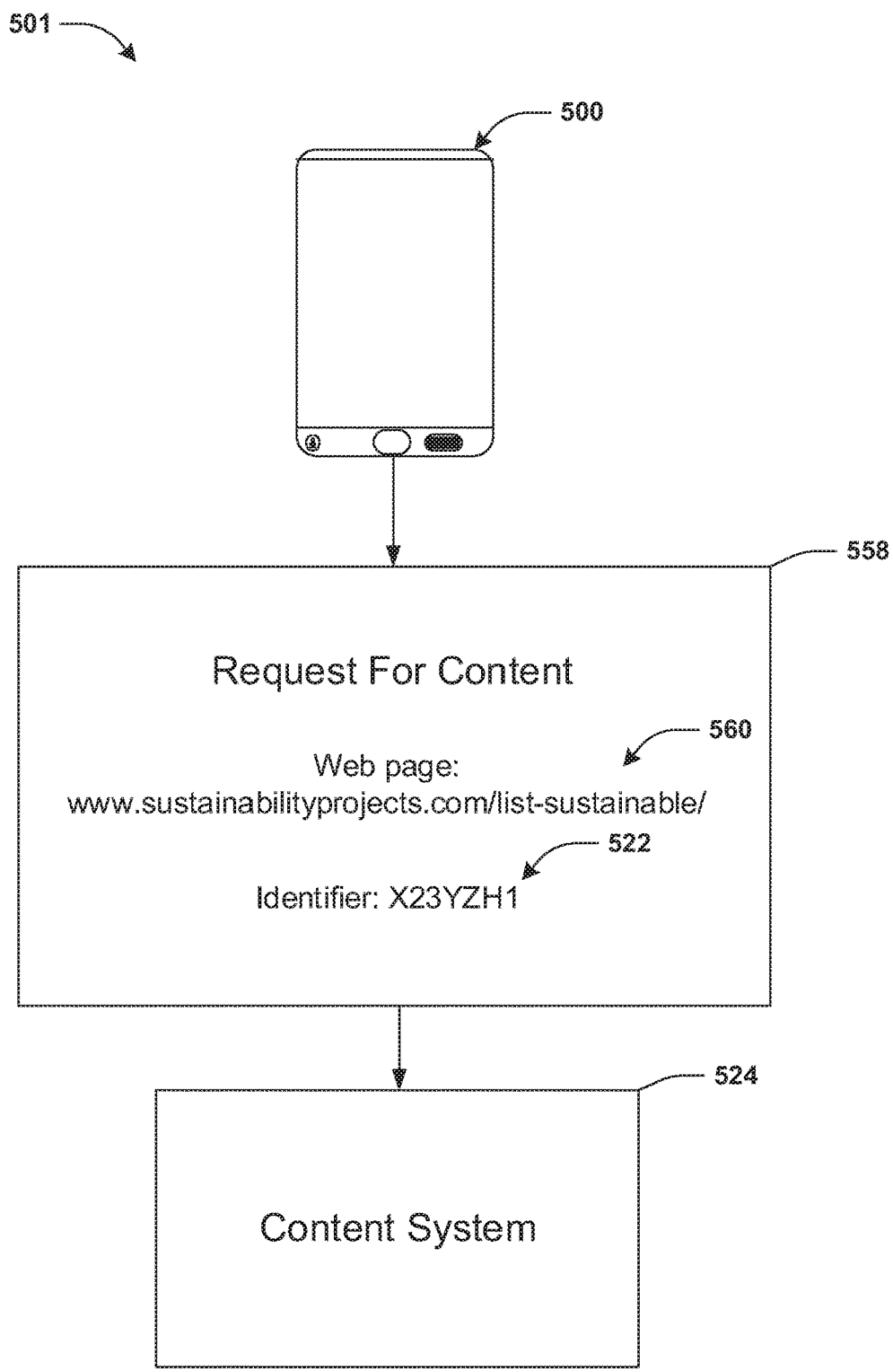
FIG. 5E is a component block diagram illustrating an example system for selecting primary languages for users and/or selecting content for transmission to the users based upon the primary languages, where a second request for content is transmitted by a device to one or more first servers associated with a content system.

FIG. 5E illustrates a second request 558 for content being transmitted by the device 500 to the one or more first servers 524 (associated with the content system). The second request 558 may be transmitted to the one or more first servers 524 by the device 500 responsive to (the device 500) accessing the fourth web page 566. In some examples, the second request 558 may comprise a third indication 560 of the fourth web page 566. The third indication 560 may comprise a third web address of the fourth web page 566 and/or a representation of the third web address. Alternatively and/or additionally, the third request 558 may comprise the identifier 522.

In some examples, the profile (e.g., of the device 500) may be identified based upon the identifier 522. In some examples, a second content item 568 may be selected from the content items database, based upon the selection of the first language 530 as the primary language. For example, the primary language may be stored in the profile and/or separately from the profile. For example, the profile may be analyzed to select an updated version of the primary language periodically. For example, the profile may be analyzed to select an updated version of the primary language once per minute, once per 30 minutes, once per hour, once per two hours, once per day, once per three days, once per week, once per month, once every 5 requests for content received (e.g., by the one or more first servers 524), once every 10 requests for content received, once every 100 requests for content received, etc. In some examples, the third indication 560 (e.g., and/or a fourth indication of the fourth web page 566) and/or a fifth indication of the second content item 568 may be stored within the profile.

Figure 5F:
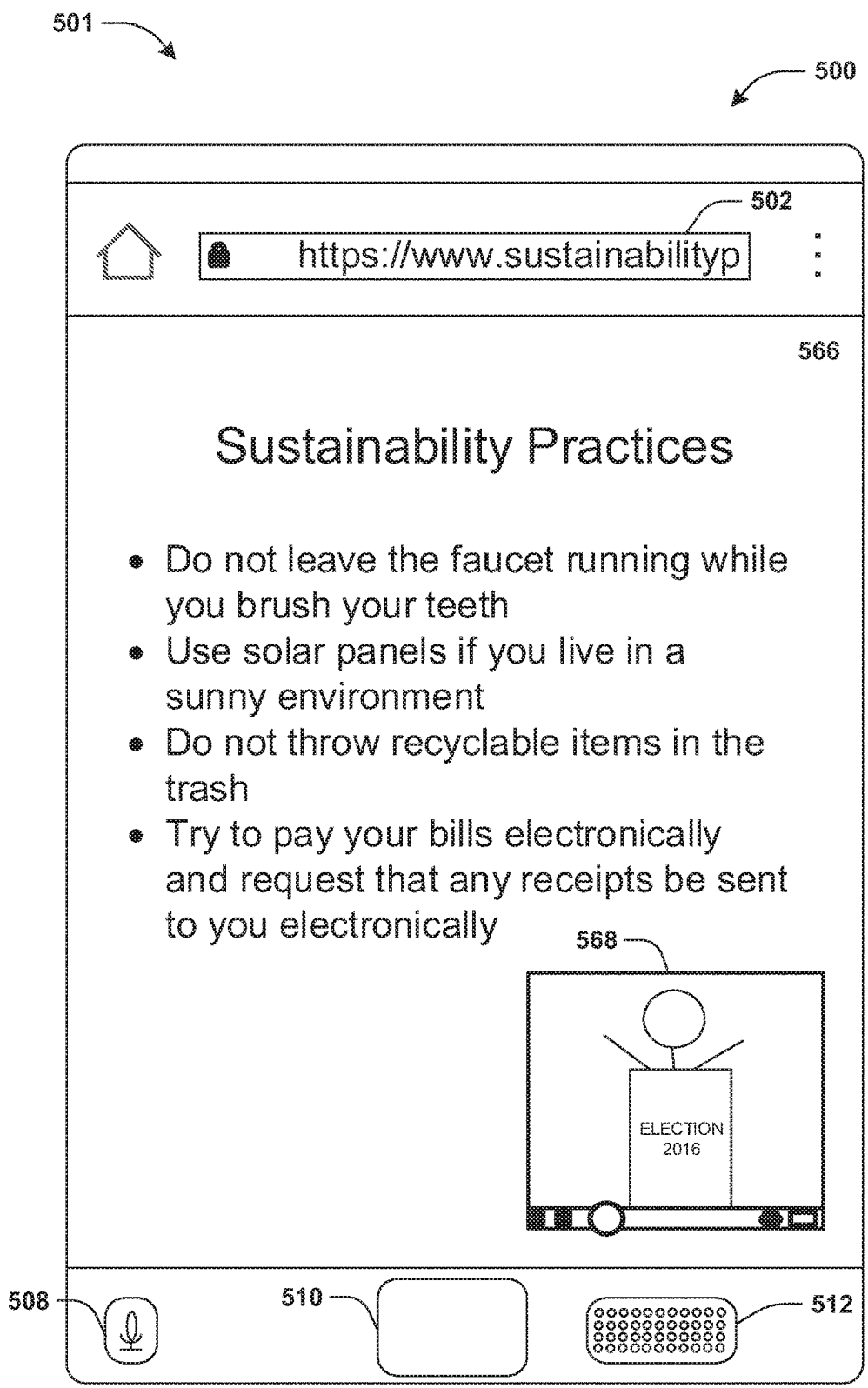
FIG. 5F is a component block diagram illustrating an example system for selecting primary languages for users and/or selecting content for transmission to the users based upon the primary languages, where a device presents and/or accesses a fourth web page comprising a second content item.

FIG. 5F illustrates the device 500 presenting and/or accessing the fourth web page 566 comprising the second content item 568. In some examples, the second content item 568 may comprise a second (e.g., selectable) graphical object (e.g., a video clip).

It may be appreciated that the disclosed subject matter may assist a user (and/or a client device associated with the user) in viewing content associated with a language that the user is familiar with.

Implementation of at least some of the disclosed subject matter may lead to benefits including, but not limited to, a reduction in screen space and/or an improved usability of a display (e.g., of the client device) (e.g., as a result of enabling the user to automatically consume content in a preferred language that the user is familiar with, wherein the user may not view a version of the content in a language that the user is not familiar with, wherein the user may not need to open a separate application and/or a separate window in order to find the content in the preferred language, etc.).

Alternatively and/or additionally, implementation of at least some of the disclosed subject matter may lead to benefits including assisting the user to develop an understanding of and/or determine a significance of the content (e.g., as a result of enabling the user to automatically consume the content in the preferred language that the user is familiar with and/or understands).

Alternatively and/or additionally, implementation of at least some of the disclosed subject matter may lead to benefits including a reduction in bandwidth (e.g., as a result of reducing a need for the user to open a separate application and/or a separate window in order to find content in the preferred language).

Alternatively and/or additionally, implementation of at least some of the disclosed subject matter may lead to benefits including more accurate and precise transmission of content to intended users (e.g., as a result of automatically determining and/or selecting one or more primary languages for each user without accessing user-declared language preferences, as a result of transmitting content to each user based upon the one or more primary languages, etc.).

In some examples, at least some of the disclosed subject matter may be implemented on a client device, and in some examples, at least some of the disclosed subject matter may be implemented on a server (e.g., hosting a service accessible via a network, such as the Internet).

Figure 6:
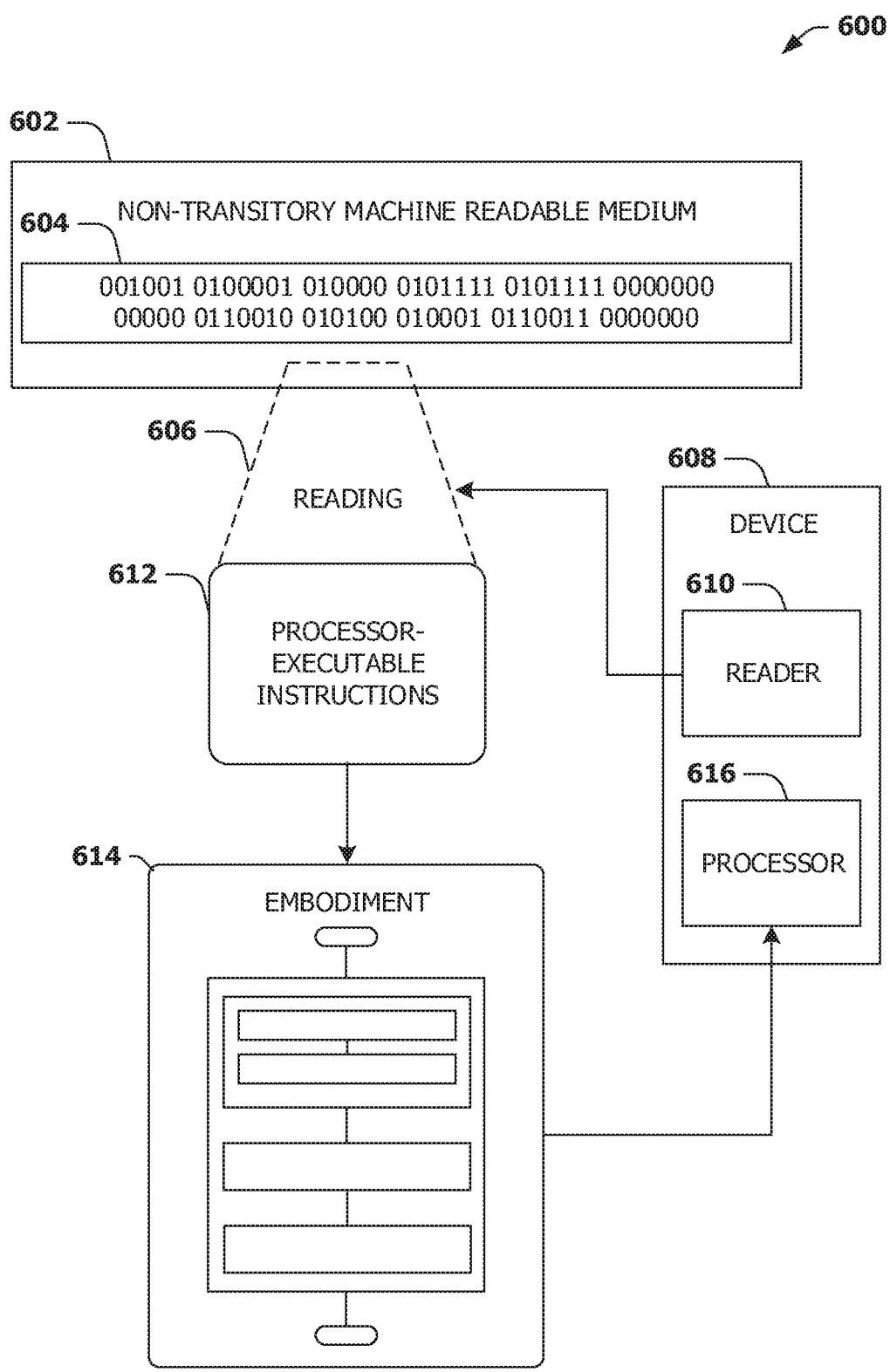
FIG. 6 is an illustration of a scenario featuring an example non-transitory machine readable medium in accordance with one or more of the provisions set forth herein.

FIG. 6 is an illustration of a scenario 600 involving an example non-transitory machine readable medium 602. The non-transitory machine readable medium 602 may comprise processor-executable instructions 612 that when executed by a processor 616 cause performance (e.g., by the processor 616) of at least some of the provisions herein (e.g., embodiment 614). The non-transitory machine readable medium 602 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disc (CD), digital versatile disc (DVD), or floppy disk). The example non-transitory machine readable medium 602 stores computer-readable data 604 that, when subjected to reading 606 by a reader 610 of a device 608 (e.g., a read head of a hard disk drive, or a read operation invoked on a solid-state storage device), express the processor-executable instructions 612. In some embodiments, the processor-executable instructions 612, when executed, cause performance of operations, such as at least some of the example method 400 of FIG. 4, for example. In some embodiments, the processor-executable instructions 612 are configured to cause implementation of a system, such as at least some of the example system 501 of FIGS. 5A-5F, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer and/or machine readable media, which if executed will cause the operations to be performed. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method, comprising:
    receiving a first request for content from a device, wherein the first request comprises an indication of a first web page associated with the first request and an identifier associated with the device, the first web page accessed by the device;
    selecting a first content item, from a content items database, based upon the first request;
    transmitting the first content item to the device, the first content item accessed by the device;
    storing an indication of the first content item and the indication of the first web page in a profile of the device, wherein the profile of the device comprises indications of a plurality of content items transmitted to the device and indications of a plurality of web pages associated with the plurality of content items;
    analyzing the profile of the device to determine two or more languages associated with at least one of the plurality of content items or the plurality of web pages, wherein the determining two or more languages comprises:
        determining a first language, of the two or more languages, associated with at least one of the first content item of the plurality of content items accessed by the device or the first web page of the plurality of web pages accessed by the device; and
        determining a second language, of the two or more languages, associated with at least one of a second content item of the plurality of content items accessed by the device or a second web page of the plurality of web pages accessed by the device;
    determining that the first language is associated with a plurality of items of the profile of the device and the plurality of items comprises more than a threshold proportion of items of the profile of the device;
    responsive to determining that the first language is associated with the plurality of items of the profile of the device and the plurality of items comprises more than the threshold proportion of items of the profile of the device, selecting the first language, from amongst the two or more languages, as a primary language of the device;
    receiving a second request for content from a second device associated with the profile of the device, wherein the second request comprises an indication of a third web page associated with the second request;
    selecting a third content item associated with the first language, from the content items database, based upon the selection of the first language as the primary language; and
    transmitting the third content item to the second device.

2. The method of claim 1, comprising:
    detecting one or more interactions associated with the first content item;
    storing one or more indications of the one or more interactions in the profile of the device wherein the profile comprises indications of a plurality of interactions associated with the plurality of content items; and
    assigning a plurality of weights to the plurality of content items, wherein the plurality of weights are determined based upon interactions associated with the plurality of content items.

3. The method of claim 2, comprising:
determining that the first language is associated with a first set of content items of the plurality of content items;
assigning a first score to the first language based upon the first set of content items and a first set of weights assigned to the first set of content items;
determining that the second language is associated with a second set of content items transmitted to the device; and
assigning a second score to the second language based upon the second set of content items and a second set of weights assigned to the second set of content items, wherein the first score is higher than the second score, wherein the first language is selected as the primary language based upon a comparison of the first score and the second score.

4. The method of claim 2, wherein the one or more indications of the one or more interactions comprises an indication of a selection of the first content item.

5. The method of claim 2, wherein the one or more indications of the one or more interactions comprises an indication that the first content item was presented by the device.

6. The method of claim 2, wherein the one or more indications of the one or more interactions comprises an indication of a proportion of the first content item that was presented using the device and an indication of a proportion of the second content item that was presented using the device.

7. The method of claim 1, comprising:
assigning a plurality of weights to the plurality of items, wherein the plurality of weights are determined based upon time elapsed since requests for content associated with the plurality of items were received.

8. The method of claim 7, comprising:
assigning a first score to the first language based upon the plurality of items and the plurality of weights assigned to the plurality of items;
determining that the second language is associated with a second plurality of items of the profile; and
assigning a second score to the second language based upon the second plurality of items and a second plurality of weights assigned to the second plurality of items, wherein the first score is higher than the second score, wherein the first language is selected as the primary language based upon a comparison of the first score and the second score.

9. The method of claim 1, comprising:
receiving a third request for content from a third device, wherein the third request comprises a user identification of a user account associated with a service for providing content;
identifying a language preference associated with the user account from a set of settings associated with the user account, wherein the language preference comprises an indication of a third language;
selecting a third content item, from the content items database, based upon the third language; and
transmitting the third content item to the third device.

10. The method of claim 1, wherein the second device is the same as the device.

11. The method of claim 1, wherein the second device is different than the device.

12. The method of claim 1, wherein the plurality of items comprises web pages of the plurality of web pages.

13. The method of claim 1, wherein the plurality of items comprises content items of the plurality of content items.

14. The method of claim 1, wherein the plurality of items comprises web pages of the plurality of web pages and content items of the plurality of content items.

15. A computing device comprising:
a processor; and
memory comprising processor-executable instructions that when executed by the processor cause performance of operations, the operations comprising:
receiving a first request for content from a device, wherein the first request comprises an indication of a first web page associated with the first request and an identifier associated with the device, the first web page accessed by the device;
selecting a first content item, from a content items database, based upon the first request;
transmitting the first content item to the device, the first content item accessed by the device;
storing the indication of the first web page in a profile of the device, wherein the profile of the device comprises indications of a plurality of web pages associated with a plurality of content items transmitted to the device;
analyzing the profile of the device to determine two or more languages associated with the plurality of web pages, wherein the determining two or more languages comprises:
determining a first language, of the two or more languages, associated with at least one of the first content item of the plurality of content items accessed by the device or the first web page of the plurality of web pages accessed by the device; and
determining a second language, of the two or more languages, associated with at least one of a second content item of the plurality of content items accessed by the device or a second web page of the plurality of web pages accessed by the device;
determining that the first language is associated with a plurality of items of the profile of the device and the plurality of items comprises more than a threshold proportion of items of the profile of the device;
responsive to determining that the first language is associated with the plurality of items of the profile of the device and the plurality of items comprises more than the threshold proportion of items of the profile of the device, selecting the first language, from amongst the two or more languages, as a primary language of the device;
receiving a second request for content from a second device associated with the profile of the device, wherein the second request comprises an indication of a third web page associated with the second request;
selecting a third content item associated with the first language, from the content items database, based upon the selection of the first language as the primary language; and
transmitting the third content item to the second device.

16. The computing device of claim 15, the operations comprising:
assigning a plurality of weights to the plurality of items, wherein the plurality of weights are determined based upon time elapsed since requests for content associated with the plurality of items were received.

17. The computing device of claim 16, the operations comprising:
assigning a first score to the first language based upon the plurality of items and the plurality of weights assigned to the plurality of items;
determining that the second language is associated with a second plurality of items of the profile; and
assigning a second score to the second language based upon the second plurality of items and a second plurality of weights assigned to the second plurality of items, wherein the first score is higher than the second score, wherein the first language is selected as the primary language based upon a comparison of the first score and the second score.

18. A non-transitory machine readable medium having stored thereon processor-executable instructions that when executed cause performance of operations, the operations comprising:
receiving a first request for content from a device, wherein the first request comprises an indication of a first web page associated with the first request and an identifier associated with the device, the first web page accessed by the device;
selecting a first content item, from a content items database, based upon the first request;
transmitting the first content item to the device, the first content item accessed by the device;
storing an indication of the first content item and the indication of the first web page in a profile of the device, wherein the profile of the device comprises indications of a plurality of content items transmitted to the device and indications of a plurality of web pages associated with the plurality of content items;
analyzing the profile of the device to determine two or more languages associated with at least one of the plurality of content items or the plurality of web pages, wherein the determining two or more languages comprises:
determining a first language, of the two or more languages, associated with at least one of the first content item of the plurality of content items accessed by the device or the first web page of the plurality of web pages accessed by the device; and
determining a second language, of the two or more languages, associated with at least one of a second content item of the plurality of content items accessed by the device or a second web page of the plurality of web pages accessed by the device;
determining that the first language is associated with a plurality of items of the profile of the device and the plurality of items comprises more than a threshold proportion of items of the profile of the device;
responsive to determining that the first language is associated with the plurality of items of the profile of the device and the plurality of items comprises more than the threshold proportion of items of the profile of the device, selecting the first language, from amongst the two or more languages, as a primary language of the device;
receiving a second request for content from a second device associated with the profile of the device, wherein the second request comprises an indication of a third web page associated with the second request;
selecting a third content item associated with the first language, from the content items database, based upon the selection of the first language as the primary language; and
transmitting the third content item to the second device.

19. The non-transitory machine readable medium of claim 18, the operations comprising:
assigning a plurality of weights to the plurality of items, wherein the plurality of weights are determined based upon time elapsed since requests for content associated with the plurality of items were received.

20. The non-transitory machine readable medium of claim 19, the operations comprising:
assigning a first score to the first language based upon the plurality of items and the plurality of weights assigned to the plurality of items;
determining that the second language is associated with a second plurality of items of the profile; and
assigning a second score to the second language based upon the second plurality of items and a second plurality of weights assigned to the second plurality of items, wherein the first score is higher than the second score, wherein the first language is selected as the primary language based upon a comparison of the first score and the second score.

* * * * *